July 17, 1934.  D. ADAMS  1,967,047
APPARATUS FOR DRAWING SHEET GLASS
Filed Oct. 16, 1930
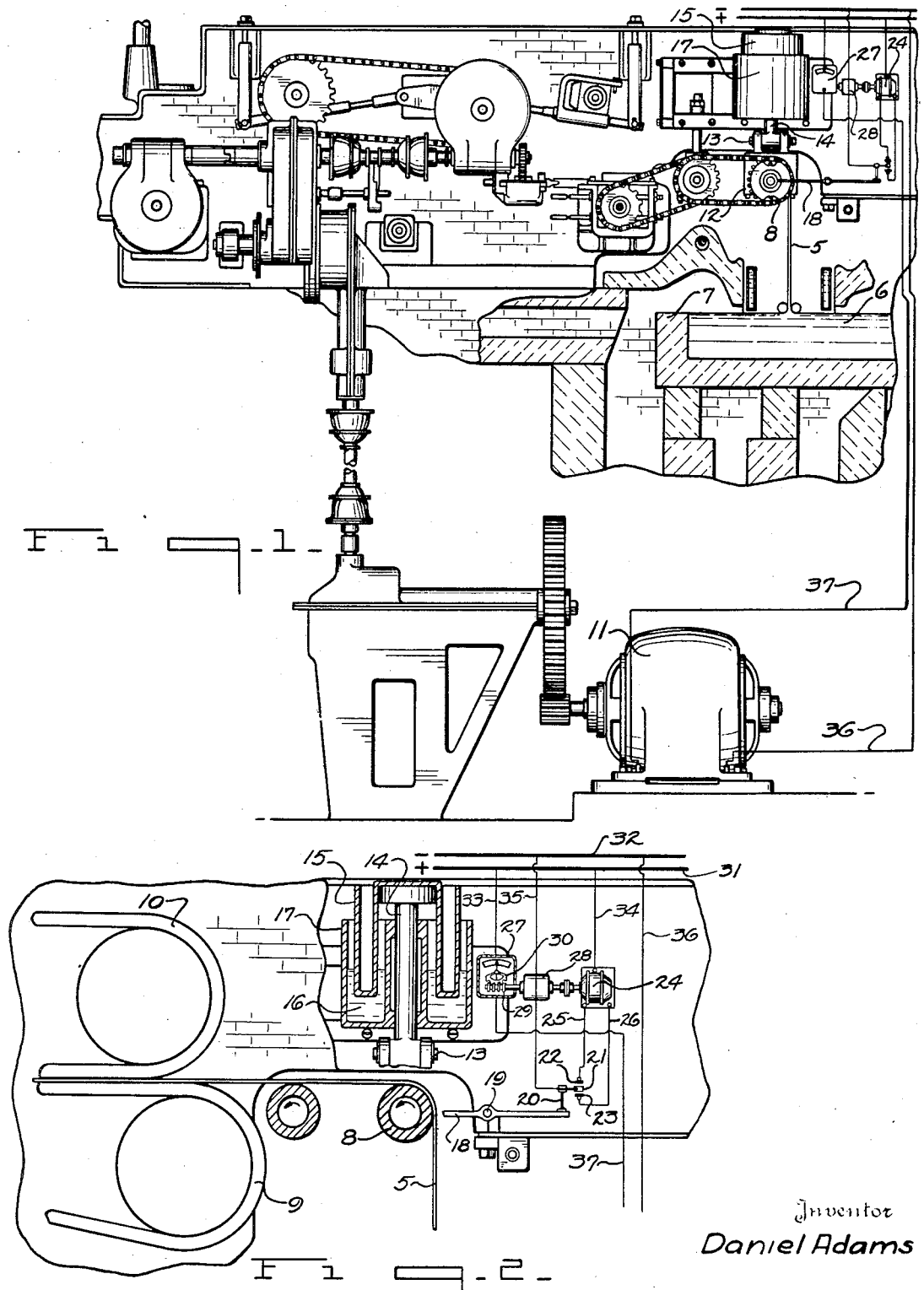
Inventor
Daniel Adams
By Frank Fraser
Attorney Patented July 17, 1934

1,967,047

UNITED STATES PATENT OFFICE 1,967,047

APPARATUS FOR DRAWING SHEET GLASS

Daniel Adams, Evanston, Ill., assignor to Libbey-Owens-Ford Glass Company, Toledo, Ohio, a corporation of Ohio Application October 16, 1930, Serial No. 489,045

15 Claims. (Cl. 49—17)

This invention relates to a process and apparatus for drawing sheet glass and more particularly for maintaining said sheet at a uniform thickness.

In the well-known Colburn process for forming sheet glass, the sheet is drawn upwardly in continuous flat sheet form from a bath of molten glass contained in a relatively shallow receptacle or draw pot, said sheet being drawn vertically for a suitable distance, after which it is deflected about a bending roll into the horizontal plane and passed horizontally into and through an annealing leer. The thickness of the sheet produced is governed by certain variable factors such as the speed at which the sheet is drawn and the temperature of the glass from which said sheet is formed. Thus, assuming that the sheet is being drawn at a constant speed, if the molten glass within the draw pot becomes too hot and fluid, the sheet will draw thin while, on the other hand, if the glass becomes too cool and viscid, the sheet will draw too thick.

It is the aim and object of the present invention to provide an apparatus whereby a more exact uniformity of thickness of sheet may be maintained by automatic variation of the speed at which the sheet is drawn to compensate for certain variables which are capable of influencing the thickness thereof, such as for example the temperature of the molten glass within the draw pot.

According to the present invention, the above object is accomplished by suspending the bending roll in such a manner that it is free to move vertically in response to any variation in the weight of the glass thereupon. Thus, the bending roll is, in effect, adapted to weigh the sheet suspended therefrom as it forms. If the sheet should start to run thin, there would be less weight suspended from the bending roll, while on the other hand, if the sheet started to run too thick, there would be an excessive weight upon the bending roll. In either event, the roll is adapted to be moved in a predetermined manner to effect the operation of means associated therewith and responsive to the movement thereof which will effect a slowing down or a speeding up of the machine so as to either increase or decrease the speed at which the sheet is drawn and thereby compensate for the variation in temperature of the molten glass. In other words, if the glass sheet should begin to run too thin, due to the fact that the molten glass from which it is drawn is too hot, the bending roll will be actuated in a manner to cause a slowing down of the machine which will have the effect of increasing the thickness of the sheet. Likewise, if the glass is drawn too thick, the bending roll will be actuated in a manner to cause a speeding up of the machine which will have the effect of decreasing the thickness of the sheet.

Other objects and advantages of the invention will become more apparent during the course of the following description when taken in connection with the accompanying drawing.

In the drawing forming a part of this application and wherein like numerals are employed to designate like parts through the same, Fig. 1 is a side elevation of one type of sheet drawing machine embodying the principles of the present invention, and Fig. 2 is an enlarged view of the means for mounting the bending roll.

For the purposes of illustration, the present invention has been shown and described as being applied to a sheet glass drawing machine of the Colburn type, although it will of course be understood that its use is not necessarily limited to this particular machine. When using the Colburn machine, a sheet of glass 5 is drawn vertically from a mass of molten glass 6 contained in a suitable receptacle or draw pot 7 and then deflected over an internally cooled bending roll 8 and passed through a combined drawing and flattening mechanism comprising a draw table 9 and clamp bars 10 into and thence through a suitable annealing leer (not shown). Any suitable means may be provided for driving the various parts of the machine and, for the purposes of illustration, the bending roll 8, draw table 9 and clamp bars 10 have been shown as being operated through suitable gears, clutches, shafts etc. connected to and driven from an electric motor 11. For a more detailed description of this driving means, attention is directed to the patent to I. W. Colburn, No. 1,248,809, granted December 4, 1917.

The bending roll 8 is journaled at each end within a bearing member 12 to which is pivoted as at 13 the lower end of a vertically disposed rod 14 carrying a piston or float 15 immersed within a bath of mercury or the like 16 contained within receptacle 17. The submergence of the float or piston is adapted to vary with the weight of the sheet upon the bending roll. This type of support is practically frictionless and permits free vertical floating movement of the bending roll.

Also secured to either one or both ends of the bending roll 8 is a scale beam 18, pivoted intermediate its ends as at 19 and carrying at its outer end a vertical post 20 to which is secured a movable contact 21 positioned between two fixed contacts 22 and 23 having connection with a relay motor 24 by means of the wires 25 and 26 respectively. The relay motor is adapted, upon operation thereof, to effect the actuation of a rheostat 27 connected therewith through suitable reduction gearing located in casing 28, and the intermeshing worm 29 and segment 30, said worm being driven from the relay motor 24.

The numerals 31 and 32 designate respectively the positive and negative main power lines. Leading from the positive line 31 are wires 33 and 34 connected to the rheostat 27 and relay motor 24 respectively, while leading from the negative line 32 are wires 35 and 36 connected respectively to the movable contact 21 and electric motor 11. Also running from the rheostat 27 to the electric motor 11 is a wire 37.

In operation, when the sheet 5, being drawn upwardly and over the bending roll 8, is of a desired predetermined thickness, the weight of the vertical portion of the sheet suspended from the bending roll will be such that the bending roll will be maintained thereby in such a position that the movable contact 21 will be out of engagement with either of the fixed contacts 22 or 23, as illustrated in the drawing. As long as this condition exists, the speed of the motor 11 and consequently the speed of draw will be constant. However, in the event of any variation in the temperature of the molten glass 6 within the draw pot 7, the glass sheet 5 may begin to draw either too thin or too thick. When this occurs, the weight of the sheet upon the bending roll will vary accordingly, which will cause a corresponding movement of the bending roll to bring the movable contact 21 into engagement with either one of the fixed contacts 22 and 23. This will cause the operation of relay motor 24 and consequent actuation of rheostat 27 which will result in either an increase or decrease in the speed of the driving motor 11 to increase or decrease the speed of draw, dependent upon whether the sheet is being drawn too thin or too thick.

Explaining more fully and assuming that the sheet is being drawn too thin, the bending roll, due to the decrease in the weight of the sheet thereon, will be permitted to move slightly upwardly, whereupon the scale beam 18 will be rocked about its pivot 19 to bring the movable contact 21 into engagement with contact 23. The engagement of the contacts 21 and 23 will complete an electric circuit through the relay motor 24, and the operation of this motor will cause an actuation of the rheostat 27 to effect a decrease in the speed of motor 11. A decrease in the speed of motor 11 will naturally tend to slow down the speed of the drawing mechanism so that the sheet will be drawn slower, permitting it to build up to the desired thickness. When the sheet attains the desired thickness, the bending roll, due to the increase in the weight of the sheet thereon, will be pulled downwardly to cause disengagement of the contacts 21 and 23, which will break the circuit through the relay motor and permit the motor 11 to again run at a constant speed.

On the other hand, in the event the sheet 5 draws too thick, the bending roll 8 will be moved downwardly by the weight of the glass depending therefrom and this movement will cause the scale beam 18 to be swung about its pivot to bring the movable contact 21 into engagement with fixed contact 22, thereby completing a circuit through the relay motor 24 and effecting actuation of the rheostat 27 in a manner to increase the speed of motor 11. When the speed of motor 11 is increased, the speed of draw of the sheet will be likewise increased and this increased speed of draw will cause a thinning of the sheet. When the sheet has been thinned down sufficiently, the bending roll will be permitted to move upwardly to its normal position, thereby causing the disengagement of the contacts 21 and 22 and allowing the motor 11 to run at a constant speed.

With the above construction, it will be apparent that only an extremely small movement of the scale beam will be required and that such an arrangement, as here provided, will be both sensitive and quick-acting so as to automatically correct small momentary variations in thickness which cannot be controlled manually. In this way, the sheet can be maintained at a substantially uniform thickness at all times, with the result that a sheet of more uniformity of thickness and consequently of an improved quality may be produced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a mass of molten glass, means for drawing a sheet therefrom, movable means for deflecting the sheet from one plane into another, and means responsive to any movement of the deflecting means occasioned by a variation in the weight of sheet produced for effecting a corresponding variation in the speed of the drawing means.

2. In sheet glass apparatus, a receptacle containing a mass of molten glass, means for drawing a sheet therefrom, movable means for deflecting the sheet from one plane into another, and means operative automatically upon movement of the deflecting means occasioned by a variation in the weight of sheet produced for effecting a corresponding variation in the speed of the drawing means.

3. In sheet glass apparatus, a receptacle containing a mass of molten glass, means for drawing a sheet vertically therefrom, a bending member for deflecting the sheet into the horizontal plane, means supporting said bending member for free vertical floating movement, and means responsive to any movement of the bending member occasioned by a variation in the weight of sheet being drawn for effecting a corresponding variation in the speed of the drawing means.

4. In sheet glass apparatus, a receptacle containing a mass of molten glass, means for drawing a sheet vertically therefrom, a bending member for deflecting the sheet into the horizontal plane, means supporting said bending member for free vertical floating movement, and means operable automatically upon movement of the bending member caused by a variation in the weight of sheet being drawn to effect a corresponding variation in the speed of the drawing means.

5. In sheet glass apparatus, a receptacle containing a mass of molten glass, means for drawing a sheet vertically therefrom, a rotatable member for deflecting the sheet from the vertical into the horizontal plane, an electric motor for driving said drawing means, and means responsive to any variation in the weight of sheet being drawn for effecting a corresponding variation in the speed of the motor driving the drawing means.

6. In sheet glass apparatus, a receptacle containing a mass of molten glass, means for drawing a sheet vertically therefrom, a rotatable member for deflecting the sheet from the vertical into the horizontal plane, an electric motor for driving said drawing means, and means operable automatically upon any variation in the weight of sheet produced for effecting a corresponding change in the speed of the motor driving the drawing means.

7. In sheet glass apparatus, a receptacle containing a mass of molten glass, means for drawing a sheet vertically therefrom, a rotatable member for deflecting the sheet from the vertical into the horizontal plane, means for supporting said deflecting means for free vertical floating movement, an electric motor for driving said drawing means, and means operable automatically upon movement of the bending member occasioned by a variation in the weight of the sheet to vary the speed of said motor.

8. In sheet glass apparatus, a receptacle containing a mass of molten glass, means for drawing a sheet vertically therefrom, a rotatable member for deflecting the sheet from the vertical into the horizontal plane, means for supporting said deflecting means for free vertical floating movement, an electric motor for driving said drawing means, and means operable automatically upon movement of the deflecting member occasioned by a variation in the weight of the sheet to vary the speed of said motor, said last-mentioned means including a rheostat connected in series with said motor.

9. In sheet glass apparatus, a receptacle containing a mass of molten glass, means for drawing a sheet vertically therefrom, a rotatable member for deflecting the sheet from the vertical into the horizontal plane, means for supporting said deflecting member for free vertical floating movement, an electric motor for driving said drawing means, and means operable automatically upon movement of the bending member occasioned by a variation in the weight of the sheet being drawn to vary the speed of said motor, said last-mentioned means including a rheostat connected in series with said motor, and a relay motor operable upon movement of the bending member for controlling the actuation of said rheostat.

10. In sheet glass apparatus, a receptacle containing a mass of molten glass, means for drawing a sheet vertically therefrom, means for deflecting the sheet from the vertical into the horizontal plane, an electric motor for driving said drawing means, and means operable automatically to vary the speed of the motor upon any variation in the weight of the sheet being drawn.

11. In sheet glass apparatus, a receptacle containing a mass of molten glass, means for drawing a sheet vertically therefrom, a bending member for deflecting the sheet into the horizontal plane, means for supporting said bending member for free vertical floating movement, an electric motor for driving the drawing means, and means operable automatically upon movement of the bending member to vary the speed of the electric motor.

12. In sheet glass apparatus, a receptacle containing a mass of molten glass, means for drawing a sheet therefrom, movable means in advance of said drawing means and engageable by the sheet being drawn, and means responsive to any movement of said last-mentioned means occasioned by a variation in the weight of sheet produced for effecting a corresponding variation in the speed of the drawing means.

13. In sheet glass apparatus, a receptacle containing a mass of molten glass, means for drawing a sheet therefrom, movable means in advance of said drawing means and engageable by the sheet being drawn, and means operable automatically upon movement of said last-mentioned means occasioned by a variation in the weight of sheet produced for effecting a corresponding variation in the speed of the drawing means.

14. In sheet glass apparatus, a receptacle containing a mass of molten glass, means for drawing a sheet therefrom, a movable member positioned in advance of said drawing means for supporting the sheet, and means responsive to any movement of said supporting member occasioned by a variation in the weight of sheet produced for effecting a corresponding variation in the speed of the drawing means.

15. In sheet glass apparatus, a receptacle containing a mass of molten glass, means for drawing a sheet therefrom, a movable member positioned in advance of said drawing means for supporting the sheet, and means operable automatically upon movement of said supporting member occasioned by a variation in the weight of sheet produced for effecting a corresponding variation in the speed of the drawing means.

DANIEL ADAMS.